(12) United States Patent
Lasa et al.

(10) Patent No.: US 8,126,254 B2
(45) Date of Patent: Feb. 28, 2012

(54) MEASUREMENT DEVICE FOR MEASURING THE PARAMETERS OF A BLADE ROTOR

(75) Inventors: Andoni Aramburu Lasa, Zarautz (ES); Ainhoa Gaston Caminos, Zumaia (ES)

(73) Assignees: Danobat, S. Coop., Elgoibar (Guipuzcoa) (ES); Ideko, S. Coop., Elgoibar (Guipuzcoa) (ES)

( * ) Notice: Subject to any disclaimer, the term of this patent is extended or adjusted under 35 U.S.C. 154(b) by 1000 days.

(21) Appl. No.: 12/061,932

(22) Filed: Apr. 3, 2008

(65) Prior Publication Data

US 2008/0273790 A1    Nov. 6, 2008

(30) Foreign Application Priority Data

May 3, 2007    (ES) .................................... 200701171

(51) Int. Cl.
*G06K 9/00* (2006.01)
(52) U.S. Cl. .............................. 382/141; 356/3.08; 451/5
(58) Field of Classification Search ........................ None
See application file for complete search history.

(56) References Cited

U.S. PATENT DOCUMENTS

| 4,812,643 | A | * | 3/1989 | Talbot ............................. 356/28 |
| 4,827,435 | A | * | 5/1989 | Marron et al. ................. 356/621 |
| 5,625,446 | A | * | 4/1997 | Bedard ........................ 356/3.08 |
| 2005/0159079 | A1 | * | 7/2005 | Astigarraga Castanares et al. ................................ 451/5 |
| 2008/0218181 | A1 | * | 9/2008 | Ducheminsky et al. ...... 356/625 |

* cited by examiner

*Primary Examiner* — Gregory J Toatley
*Assistant Examiner* — Juan D Valentin
(74) *Attorney, Agent, or Firm* — Dennis G. LaPointe

(57) ABSTRACT

The invention relates to a measurement device for measuring the parameters of a blade rotor and a measurement process for measuring with said device, consisting of an element (1) in which at least one high speed camera (2) and a light beam emitter (3) are arranged in opposition, said element (1) being incorporated on a mobile support (5) which allows adjusting the distance with respect to the rotor (4) object of the measurement, and the assembly being connected to a processor (8) for controlling the measurement process and for processing the data which is obtained.

6 Claims, 7 Drawing Sheets

SEAL  BLADE

MEASUREMENT DEVICE FOR MEASURING THE PARAMETERS OF A BLADE ROTOR

FIELD OF THE ART

The present invention relates to the measurement of the different parameters to be controlled of a rotor, proposing a device which, by means of a high speed digital camera, measures both the tips of the blades and the seals at high speed in order to carry out a correct grinding thereof.

STATE OF THE ART

In order to improve the efficiency of a turbine all the mechanisms which can give rise to losses must be focused on. In this sense the distance existing between the walls of the stator and the blades of the rotor (compressor) is one of the main factors determining the efficiency of the engine.

Among the different methods which have been developed to improve the distance of the blades, the most important is the grinding process during the manufacture or maintenance of the engine. In order to grind the blades to the suitable dimension, these blades must be measured according to the specifications of the rotor of the engine, such that those which are not located within tolerances must be replaced or recycled in order to be subjected to a grinding process leaving them in the required dimensions.

In this sense different grinding methods are known in the State of the Art, the oldest method among them involves carrying out a manual grinding while the rotor is stopped. However given the mobility of the blades, which do not reach their actual position until the rotor is not moving, the manual grinding leads to multiple sizing errors.

In this sense German Patent DE 2448219 by Siemens Aktiengesellschaft filed on Oct. 7, 1974, describes a method for measuring the tips of the rotor blades of a turbine.

This apparatus measures the height of the blade in the rotor while it is turning, for which it implements a laser beam emitter. This emitted laser beam is deflected, being reflected at the end of the blade to be measured, such that the height of the blade is determined by means of an electronic analysis circuit.

However, in order for the measurement to be correct it is necessary to synchronize the stopping of the blade of the rotor with the emission of the deflected laser beam, and the latter with the analysis circuit, which is very complex and expensive.

American Patent U.S. Pat. No. 4,566,225 by Societe Nacionale d'Etude et de Construction de Moteurs d'Aviation filed on Apr. 18, 1984 in turn describes a process and an apparatus for measuring the blades of a rotor of a turbine which allows individually measuring the blades of the turbine by means of using a stroboscopically controlled laser beam.

The device incorporates emitting a laser beam having a predetermined height tangentially directed through the rotor of the turbine in a direction generally perpendicular to its axis of rotation, such that the tips of the blades extend at least partially into the beam.

A photoelectric cell is arranged in the field of the beam in the opposite place of the rotor of the turbine, such that it can receive the portion of the laser beam which has not been obscured by the presence of the tip of the blade of the turbine. This photoelectric cell generates an electric signal based on the luminous intensity of the laser beam, which is sent to a recorder-analyzer recording and showing the height of the blade.

The process also uses stroboscopic control means connected to the laser apparatus such that each blade can be independently measured.

Spanish Patent ES 2253692, of the same applicant of the present invention, describes a grinding machine for grinding a rotor having an optical system for measuring the radius of the blades during the grinding operation.

This machine comprises an optical sensor aligned according to a reference axis with the rotor stage and the grinding wheel which is working and a measuring instrument (such as a computer for example) transmitting a representative signal of the alignment of the wheel and of the measurement obtained of the radius to the control unit.

The optical sensor comprises a light source emitting a collimated beam and an electronic photodetector, both arranged in two opposite arms of an arch shaped support with a greater circumference than the rotor stages. The arms are located encircling the rotor stage which is ground.

The collimated beam completely illuminates the blades passing through the source and the photodetector when rotating, the latter receiving an image of successive lights and darks of light intensity corresponding to the crossing of each blade with the beam. This information is transmitted to the computer which combines it with a signal of the speed of the rotor for its subsequent processing in the control unit.

The main drawback of these solutions included in the State of the Art is the complexity of developing the optical sensor located in the measurement system and the complexity involved in processing the obtained signals, which makes the measurement system slow and expensive.

In addition, the measurement of certain parameters of the rotor such as for example the seals forming mobile gaskets which are closed with the stator and prevent the air from not following its path, is a very complicated measurement due to the fact that the seals are very small, therefore the detection of the change of intensity in the light is not detected, and due to the fact that the seals have a pivoting movement forcing the measurement to be carried out when these seals are expanded by the speed of the rotor. For this reason they require a very exact measurement in addition to a previous location of their position, since a closure between the rotor and the stator that is too large determines a contact that is too large which can generate excessive heat and even cause a fire.

OBJECT OF THE INVENTION

According to the present invention a measurement device for measuring the parameters of a rotor is proposed which, as a result of its constructive and/or functional features, is truly advantageous compared to conventional solutions for the same application.

The invention consists of a measurement device for measuring the dimensions of any element rotating at a high speed, such as the blades or the seals of a rotor for example.

The device is formed by a measuring apparatus, a processor and an encoder located in the shaft of the rotor. The measuring apparatus is in turn formed by a light beam emitter and a high speed digital camera, each of them located on an arm of the structure of the mentioned measuring apparatus.

In this sense, for measuring the blades of a rotor when the rotor is in movement, the encoder captures the number of turns made, whereas the light beam emitter emits a beam which, upon the passage of the blades, allows the high speed digital camera to capture a variation in the luminosity emitted, forming the image from individual pixel lines which are sequentially captured at a certain frequency, each pixel carrying information on the light received by the camera.

From the time evolution of the captured data, a movement curve of the blades is obtained, which once processed provides a signal from which a list of the measurements of each of them is obtained. This signal is compared with a table of the dimensions of the theoretical radius of the rotor being measured, obtaining the existing deviations.

As has already been previously indicated, another of the parameters of the rotor to be measured are the seals, which are gaskets which are closed with the stator and prevent air from passing through areas through which it should not circulate, the closure between the rotor and the stator having to be perfect.

The seals are hoop or ring shaped and have tips which are usually measured for their grinding, these tips are complicated to measure given that in addition to being very small, the rings have a pivoting movement which implies that the rotor has to be in movement in order to carry out the measurements.

Due to the banding of the rings, the measuring apparatus, i.e. the high speed line camera, can detect the seal below, above or exactly on the measurement line, therefore a movement of the shaft for orienting the camera for each turn of the rotor is necessary.

As with the measurement of the blades, the data taken in the measurement is transferred to the processor, obtaining a list of measurements of the seals, providing the deviation of each of them upon being compared with the data of real measurements.

DETAILED DESCRIPTION OF THE INVENTION

The object of the present invention is related to the grinding of the blades and the seals of the rotors of aircraft engines or for generating energy, proposing a measurement device for measuring parameters, designed to carry out measurements with the rotor in movement, which as a result of its constructive and functional features provides quickness and accuracy in the measurements compared to conventional solutions.

The measurement device (1) object of the invention forms a C-shape, having in opposition a high speed camera (2), such as a line camera for example, at one of the ends, and a light beam emitter (3) at the other end.

Figure 1:
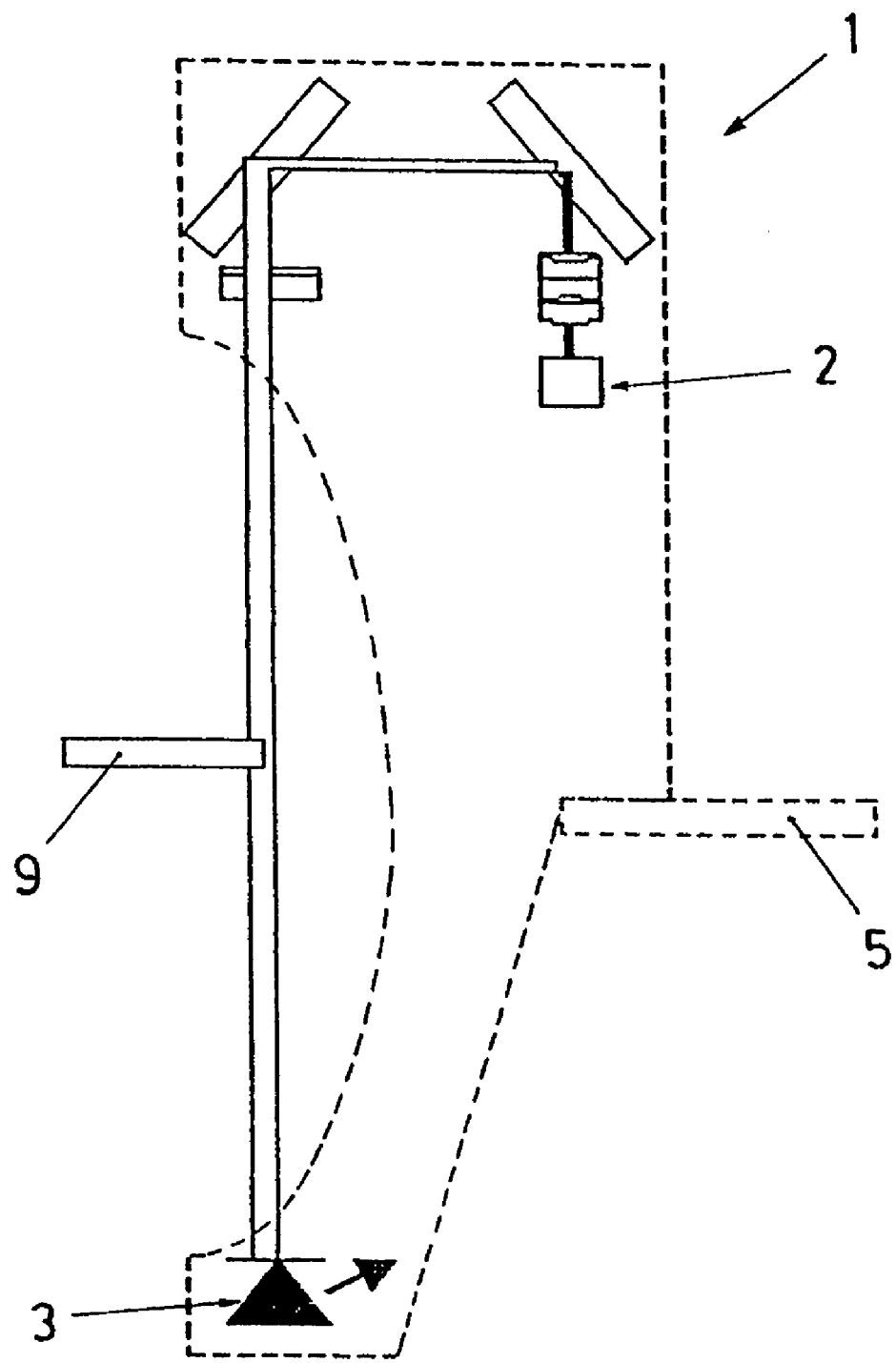
FIG. 1 shows a schematic elevational view of the device object of the invention.
Figure 2:
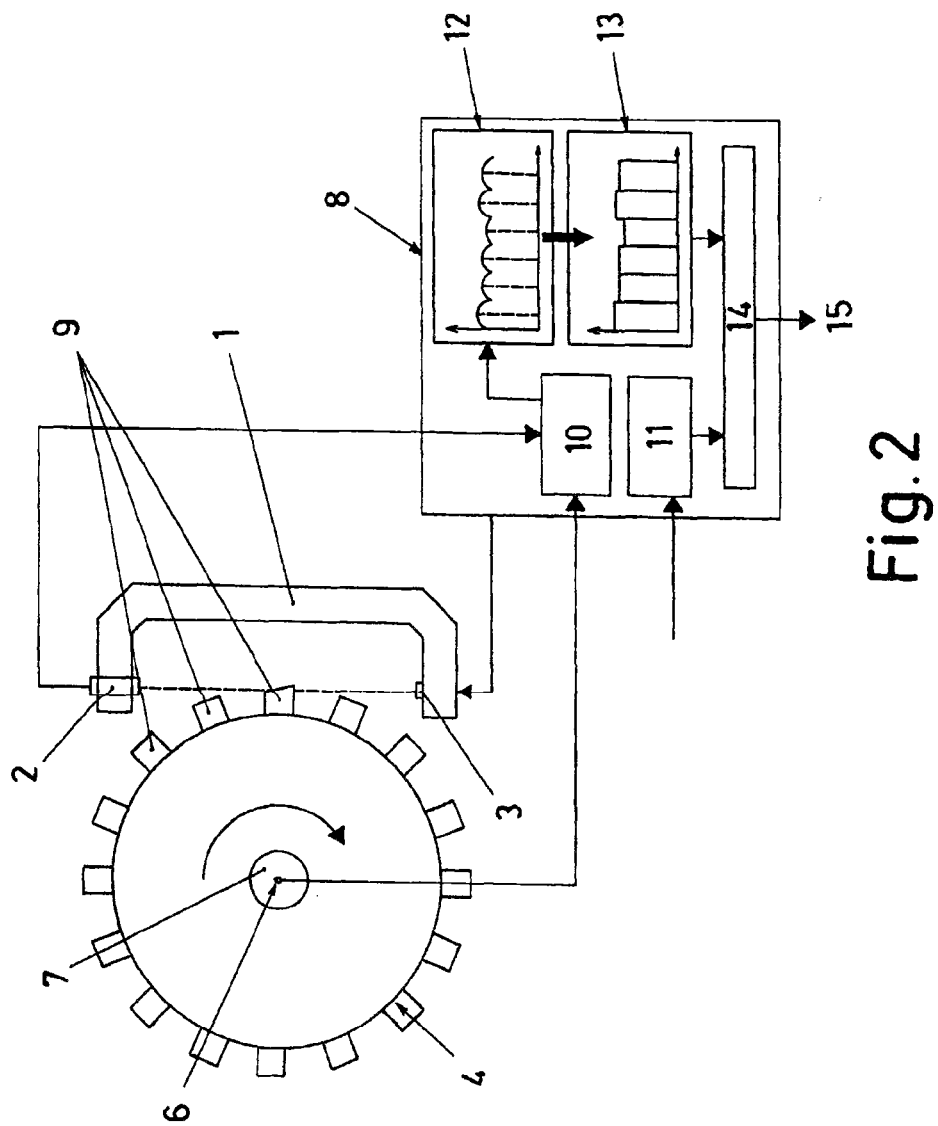
FIG. 2 shows a block diagram of the operation of the device object of the invention.

The measurement device (1) is arranged located opposite the rotor (4) on which the measurements are to be carried out on a mobile support (5) which allows adjusting the distance existing between said measurement device (1) and the rotor (4), depending on the type of rotor (4) the parameters of which are to be measured, see FIGS. 1 and 2.

As is shown in FIG. 2, in the shaft (6) of the rotor (4) on which the measurements are carried out there is placed an encoder (7) or a rotation or turn pass detector, connected to a processor (8) providing the angular position in which the parameter, blade (9) or seal (16, 17, 15 18) to be measured is located.

The processor (8) is in turn connected to both the high speed camera (2) and to the light beam emitter sensor (3).

In addition, said processor (8) has a digitizer (10) transferring the data (12) obtained by the measuring apparatus (1) to the processor (8), and a memory (11) having the real features of the different types of rotors (4) existing on the market.

According to the parameter on which the measurement, blade (9) or seal (16, 17, 18), is carried out, the measurement device (1) is oriented axially or transversely to the shaft (6) of the rotor (4).

In this sense, the measurement device (1) is oriented transversely to the shaft (6) of the rotor (4) in order to measure the blades (9) of the rotor (4).

Once the measurement device (1) is oriented transversely, the distance at which it is located with respect to the rotor (4) to be measured is adjusted according to the type of rotor (4) in question, for which the support (5) on which it is located is moved.

The light beam emitter (3) projects light in the direction transverse to the blade (9). The line camera (2) is positioned such that the point of the blade (9) corresponding with the maximum theoretical radius with respect to the shaft (6) of the rotor (4) of the blade (9) to be measured is seen.

Due to the fact that the blade (9) is interposed between the camera (2) and the light beam emitter (3), the camera (2) captures a light-dark image corresponding with the part of light passing through and that which does not pass through the interposition of the blade (9).

From the time evolution of said captures, a movement curve of the blade is obtained, which is transferred by means of the digitizer (10) to the processor (8) to which the high speed camera (2) is connected.

By means of a processing algorithm of the processor (8), a list of measurements (13) of the different blades (9) of the rotor (4) is obtained from the data signal (12) taken by the camera (2), which list is compared (14) with the theoretical measurements of the type of rotor (4) being measured saved in the memory (11) of the mentioned processor (8), obtaining the data necessary for grinding the blades (9).

When measuring the seals (16, 17, 18) of the rotor (4), the measurement device (1) is arranged oriented axially to the shaft (6) of the rotor (4).

As has been previously indicated, the seals (16, 17, 18) are gaskets of the rotor (4) which are closed on the stator, making a joint between both preventing air from passing through areas through which it should not pass.

The seals (16, 17, 18) are ring shaped and have tips which must have very exact dimensions in order to be able to carry out their function.

Measuring this parameter is complicated given that the seals (16, 17, 18) have a pivoting movement, whereby in its detection by means of the measurement device (1) it is sometimes detected above the measurement line (19) of the high speed camera (2), oversize (16), below the measurement line (19), undersize (17), or exactly on the measurement line (19), in size (18).

In this sense, during the measurement of the seals (16, 17, 18), for each turn of the rotor (4) detected by the encoder (7) positioned in the shaft (6) of the rotor (4), the distance between the measurement device (1) and the rotor (4) is adjusted.

In order to adjust the distance, the initial position of the shaft of the measurement device (1) corresponds with a calibration radius which is that in which the measurement line (19) of the camera (2) detects the object to be measured, generating a light-dark image determining the position of the seals (16, 17, 18) with respect to the measurement line (19). Once the initial position is calibrated, the measuring is begun.

Figure 3:
FIG. 3 shows the image of an oversize seal captured by the high speed camera.

The measurement starts with the positioning of the shaft of the measurement device (1) at the minimum radius, in which all the seals (16, 17, 18) are detected. The distance between the shaft of the measurement device (1) and that of the rotor (6) is adjusted for each measurement by small positional increments (for example of about 10 µm), obtaining different images corresponding to the different positions occupied by the seals (16, 17, 18) with respect to the measurement line (19) of the camera (2), i.e.:

Oversize seals (16), the radii of which are greater than that corresponding to the position of the shaft of the measurement device (1), see FIG. 3.

Figure 4:
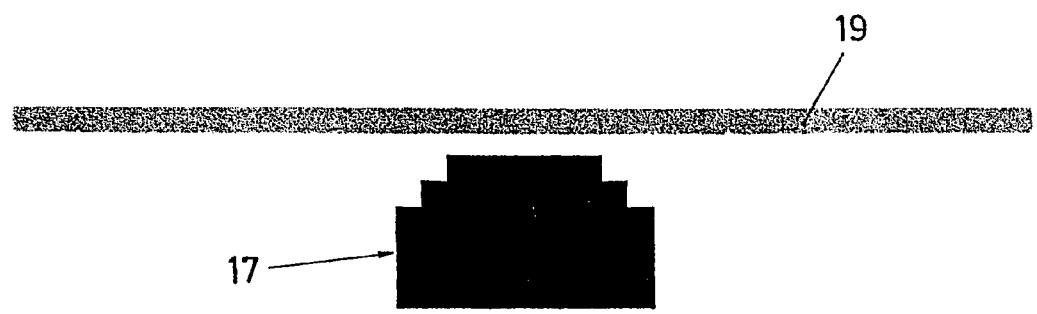
FIG. 4 shows the image of an undersize seal captured by the high speed camera.

Undersize seals (17), corresponding to the seals the radii of which are smaller than that corresponding to the position of the shaft of the measurement device (1), see FIG. 4.

Figure 5:
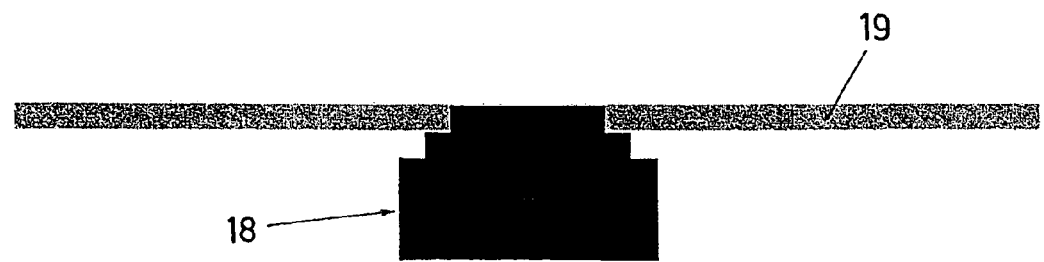
FIG. 5 shows the image of an in size seal captured by the high speed camera.

In size seals (18), which are the seals the radii of which correspond with the position of the shaft of the measurement device (1), see FIG. 5.

The camera (2) thus transmits to the processor (8), through the digitizer (10), for each position of the shaft of the measuring apparatus (1), a list of all the in size seals (18) located on the measurement line (19), a list of the undersize seals (17) located below the measurement line (19) and a list of the oversize seals (16) located above the measurement line (19).

This data allows subsequently, during the grinding of the seals (16, 17, 18), being able to follow, according to the results obtained in the measurement, two grinding criteria: maximum seals in which there is no seal above the measurement line (19), or minimum seals, in which the number of seals below the measurement line (19) or on the measurement line (19) must not be equal to the number of seals over the measurement line.

Figure 6:
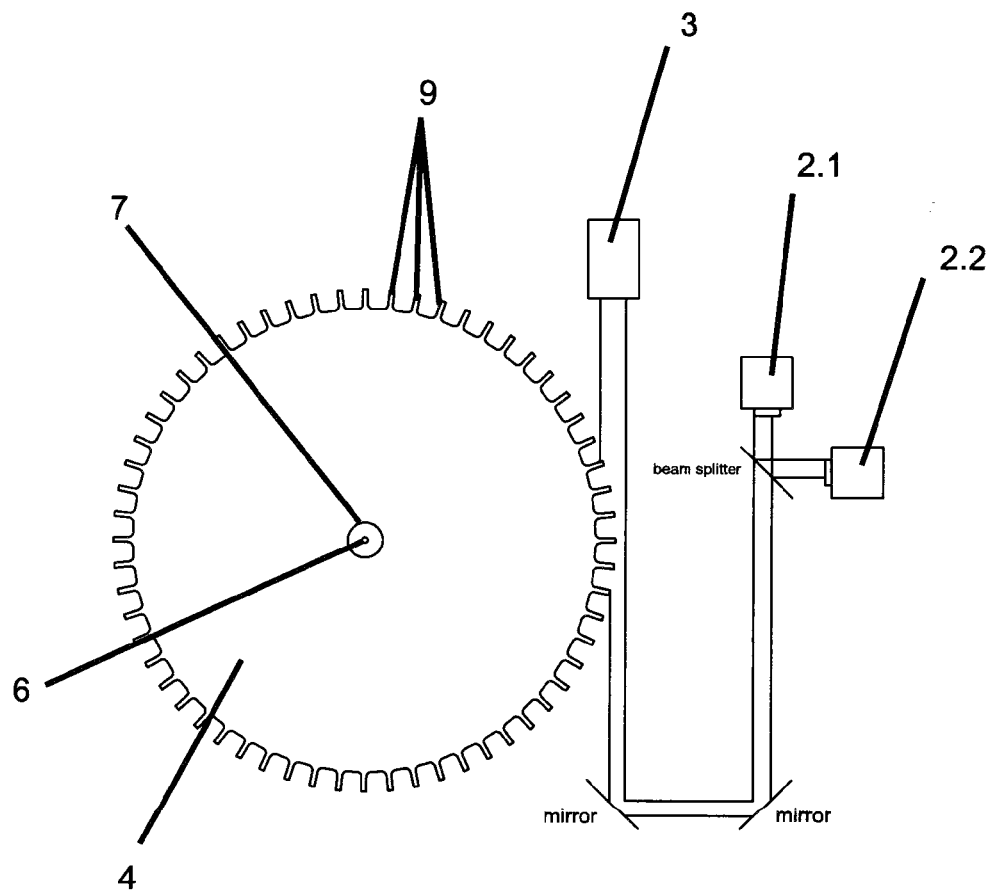
FIG. 6 is a schematic image depicting a structural correlation of high speed cameras and the beam splitter.

In an embodiment of the measurement device (1), as depicted in FIG. 6, the incorporation of two high speed cameras (2.1, 2.2) is provided, one of which is oriented axially (camera 2.2) and the other of which is oriented transversely (camera 2.1), such that the former measures the seals and the second measures the blades. To that end a beam-splitter is arranged next to the light beam emitter (3) of the measurement device (1), such that the reorientation of the entire measurement device (1) according to the type of parameter to be measured is eliminated, both measurements being able to carry out simultaneously. The rays of light emitted by the light source (3), which interact with the rotor blade/seal (9), are received by the beam splitter which splits the rays of light in such a way that it sends the rays of light traveling in the X-direction to the axially oriented high speed camera (2.2) and the rays of light traveling in the Y-direction to the transversally oriented high speed camera (2.1).

Figure 7:
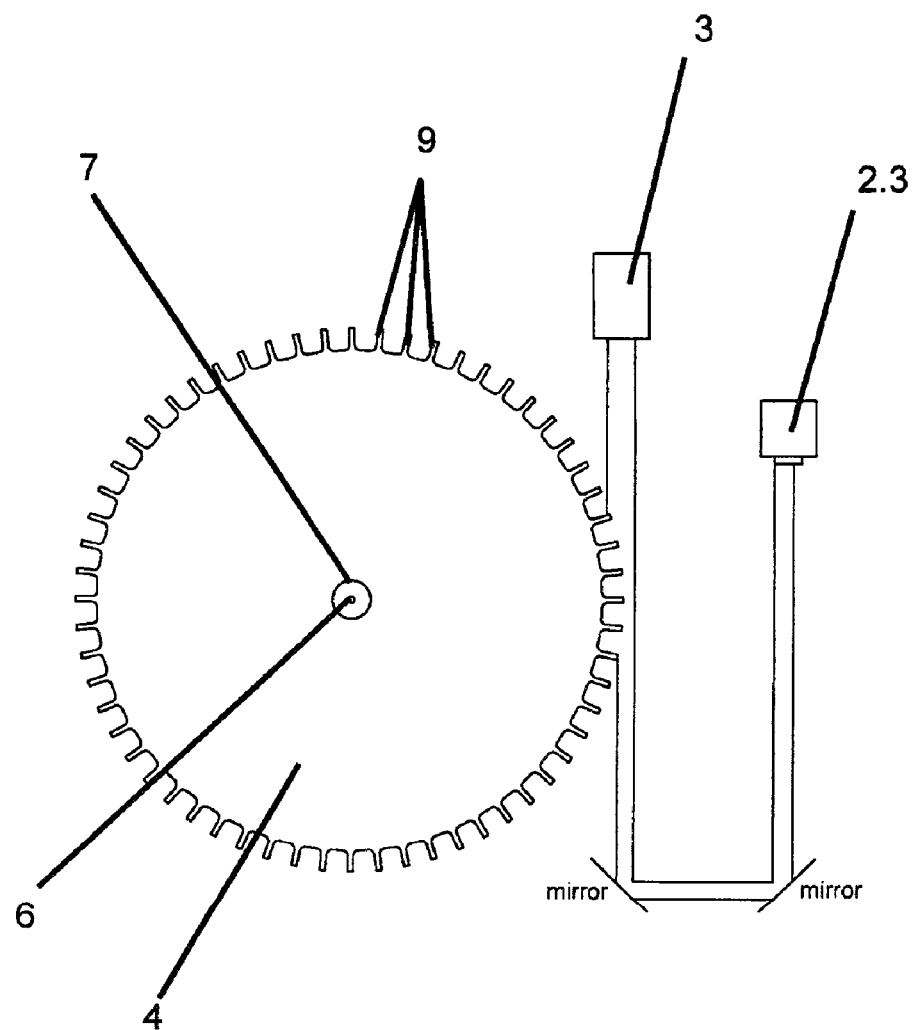
FIG. 7 is a schematic image depicting a structural correlation of an area camera.
Figure 8:
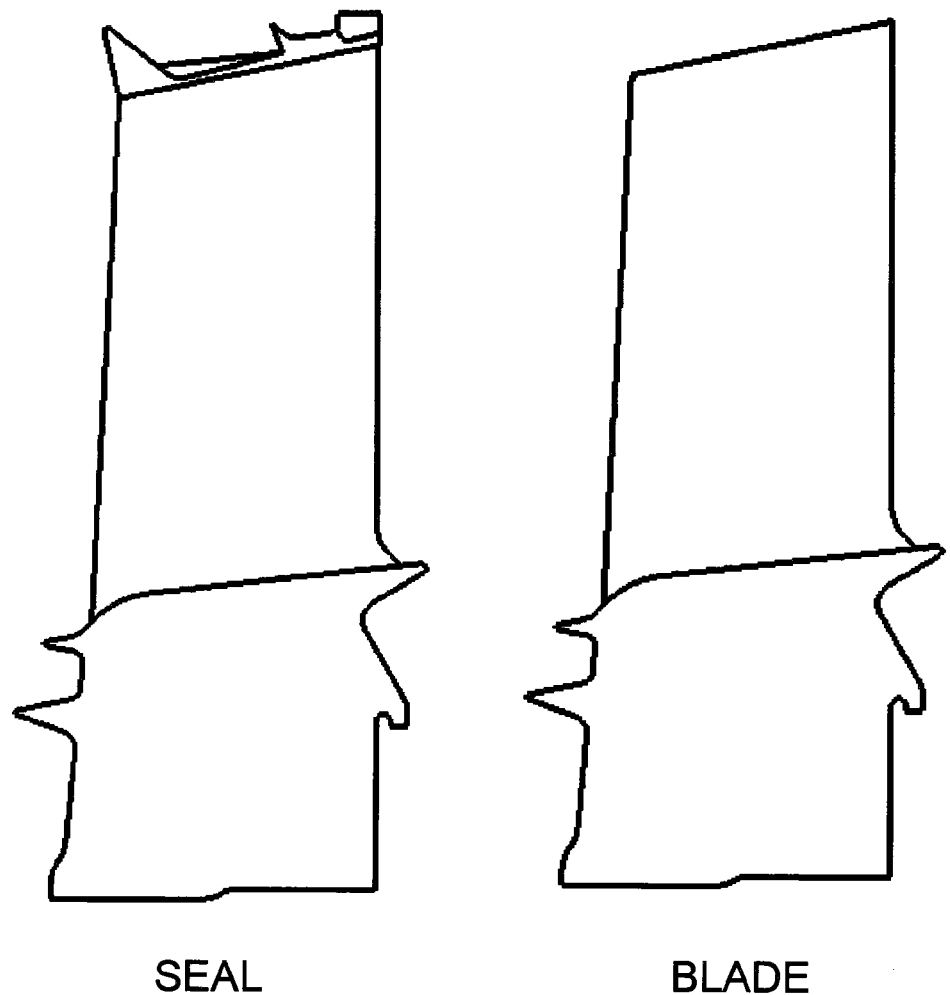
FIG. 8 is an image depicting a blade and seal.
Figure 9:
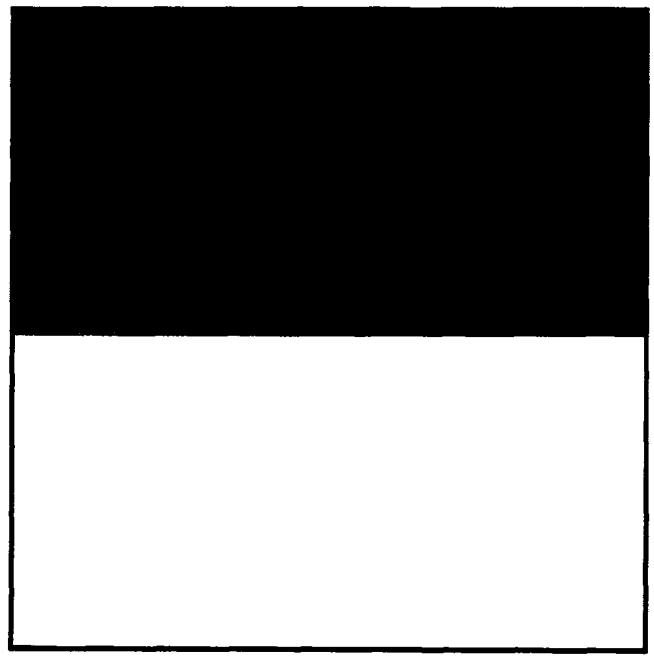
FIG. 9 is a depiction of an axial-transversal image.
Figure 9:
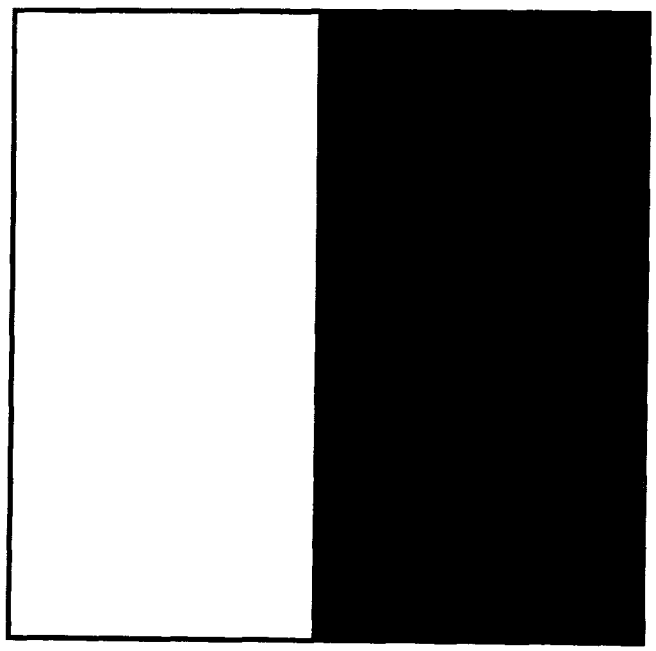

In another embodiment as depicted in FIG. 7, the incorporation of an area camera (2.3) such as a high speed camera is provided that is, area camera (2.3) replaces high speed camera (2) previously described above, such that simultaneous measurements are carried out both axially and transversely to the shaft (6) of the rotor (4). Notice that the area camera (2.3) in this embodiment acts similarly to a beam splitter as well as acting as a camera in that it can break the image down into an X-image and a Y-image.

The invention claimed is:

1. A measurement device for measuring the parameters of blades and seals of a blade rotor for carrying out measurements in rotors of aircraft engines or for generating energy at high speed, characterized in that it consists of a C-shaped element, having in opposition at least one high speed camera at one of the ends and a light beam emitter at the other end, the C-shaped element located opposite a blade rotor, on which measurements related to a length of the blades in a rotor axis-outward direction and to a length of the seals in the rotor axis-outward direction are to be simultaneously carried out, being arranged on a mobile support which allows adjusting a distance existing between the C-shaped element and the blade rotor, according to the type of blade rotor, parameters of the blade rotor including the blades and the seals to be simultaneously measured, and an assembly formed by said C-shaped element and the blade rotor being connected to a processor for controlling the measurement process and for processing an obtained data;

characterized in that the measurement device further comprises an axially oriented high speed camera, said high speed camera being axially oriented with respect to said blade rotor in combination with said high speed camera, wherein said high speed camera is oriented transversally with respect to said blade rotor, and a beam-splitter next to the light beam emitter, said beam splitter being configured and oriented with respect to the high speed cameras wherein rays of light emitted by the light beam emitter, which interact with the blades and the seals, are received by the beam splitter which splits the rays of light in such a way that it sends the rays of light traveling in an X-direction to the axially oriented high speed camera and the rays of light traveling in the Y-direction to the transversally oriented high speed camera, such that measurements of both the blades and the seals of the blade rotor to be measured are simultaneously carried out.

2. A measurement device for measuring the parameters of a blade rotor according to claim 1, characterized in that the high speed camera is a high speed line camera.

3. A measurement device for measuring the parameters of a blade rotor according to claim 1, characterized in that in a shaft defining an axis of rotation of the blade rotor on which the measurements are carried out, there is placed an encoder or a rotation or turn pass detector, connected to the processor, providing an angular position in which the parameter to be measured is located.

4. A measurement device for measuring the parameters of a blade rotor according to claim 1, characterized in that the processor is connected both to the high speed camera and to the light beam emitter sensor.

5. A measurement device for measuring the parameters of a blade rotor according to claim 1, characterized in that the processor has a digitizer transferring the data obtained in the measurement to the processor, and a memory which allows storing real features of different types of blade rotors.

6. A measurement device for measuring the parameters of a blade rotor according to claim 1, characterized in that according to another embodiment, the high speed camera serves as an area camera, the area camera being configured and oriented with respect to the blade rotor so as to act similarly to a beam splitter as well as acting as a camera in that it can break down into an X-image and a Y-image, wherein simultaneous measurements are carried out both axially and transversely relative to a shaft defining an axis of rotation of the blade rotor.

* * * * *